(12) United States Patent
Kim et al.

(10) Patent No.: US 12,425,238 B2
(45) Date of Patent: Sep. 23, 2025

(54) DATABASE TENANT-LEVEL MOVE

(71) Applicant: SAP SE, Walldorf (DE)

(72) Inventors: Hyunjun Kim, Seoul (KR); Eunsang Kim, Seoul (KR); Jian Luo, Shanghai (CN); Patrick Voelker, Mannheim (DE); Jaeyoung Choi, Seoul (KR); Yong Sik Kwon, Seoul (KR); Mihnea Andrei, Seoul (KR)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 18/303,065

(22) Filed: Apr. 19, 2023

(65) Prior Publication Data

US 2024/0356762 A1    Oct. 24, 2024

(51) Int. Cl.
*H04L 9/32* (2006.01)
*G06F 16/21* (2019.01)
*G06F 21/62* (2013.01)

(52) U.S. Cl.
CPC .......... *H04L 9/3268* (2013.01); *G06F 16/214* (2019.01); *G06F 21/6218* (2013.01)

(58) Field of Classification Search
None
See application file for complete search history.

(56) References Cited

U.S. PATENT DOCUMENTS

| | | | |
|---|---|---|---|
| 9,229,996 B2 * | 1/2016 | Konersmann | G06F 16/211 |
| 11,442,908 B2 * | 9/2022 | Almumen | G06F 16/128 |
| 2017/0169059 A1 * | 6/2017 | Horowitz | G06F 16/211 |
| 2019/0102384 A1 * | 4/2019 | Hung | G06F 9/4843 |
| 2023/0085481 A1 * | 3/2023 | Padmanabhan | G06Q 30/0601 705/64 |

* cited by examiner

*Primary Examiner* — Brandon Hoffman
(74) *Attorney, Agent, or Firm* — Buckley, Maschoff & Talwalkar LLC

(57) ABSTRACT

Systems and methods include reception of a request to move a first database tenant from a first database instance to a second database instance, the first database tenant comprising a first tenant object instance associated with a plurality of artifacts of the first database instance, the plurality of artifacts including a tenant-level catalog and data. In response to the request, the tenant-level catalog is exported from the first database instance to a shared storage system, the tenant-level catalog is imported to a second tenant of the second database instance from the shared storage system, the data is exported from the first database instance to the shared storage system, the data is imported to the second tenant of the second database instance from the shared storage system, and the first database tenant is dropped from the first database instance.

14 Claims, 11 Drawing Sheets

DATABASE TENANT-LEVEL MOVE

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple unrelated end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding "tenant" in the underlying data layer. This mapping allows for logical separation of the data of various tenants within the data layer and facilitates access to tenant-specific data by the multi-tenant application. In some multi-tenant architectures, the data of each tenant is managed by a different database instance executing within the same computing system (e.g., a rack server). These architectures provide good separation of tenant data, but it may be cost-inefficient in some scenarios to require a full database instance per tenant. For example, the smallest database instance may consume 32 Gb of memory, which may represent significantly more computing resources than would otherwise be required by a small tenant.

Other multi-tenant architectures use a single database instance to manage the data of multiple tenants. Multi-tenant architectures that use a single database instance to manage the data of multiple tenants allow the sharing of resources (e.g., processor cycles, memory) between tenants while maintaining tenant-specific data isolation. Since the data in such an architecture is not physically separated, the multi-tenant application is responsible for tracking and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. In another example, the multi-tenant application assigns a dedicated schema to each tenant. In either case, the database system is unaware of the existence of the multiple tenants and operates in the same manner as if it were being accessed by a single-tenant application.

Recent database systems provide native multi-tenancy via a database-level tenant object (e.g., a database catalog object) which facilitates the implementation of multi-tenant architectures on the application layer. A native multi-tenant database system may include one or more database instances, the data of all tenants, and engines for processing the data. The single system also includes a single persistence to store the data of all the tenants. By allowing multiple independent tenants to be hosted on a single instance and share computing resources, deployment of a new tenant to a database instance is associated with a near-zero marginal cost.

The tenant object is a logical collection of data and metadata artifacts which have been assigned to a tenant. Tenants may be exposed as first-class database objects (i.e., having an identity independent of any other database entity. A native multi-tenant database which efficiently supports tenant-level operations, such as movement of tenants between database instances, is desired.

DETAILED DESCRIPTION

The following description is provided to enable any person in the art to make and use the described embodiments. Various modifications, however, will be readily-apparent to those in the art.

Some embodiments provide movement of tenants between native multi-tenant database instances. Generally, a target database instance is created with suitable resources to support a copy of an existing source tenant of an existing source database instance. The target database instance may be created on a same database service platform (e.g., application cluster) as the source database instance or on another database service platform. An empty target tenant is then created in the target database instance having the same configuration as the source tenant.

After stopping transactions on the source tenant, a tenant-level catalog (i.e., tenant-level metadata) of the source tenant is exported to a shared storage, such as but not limited to a cloud-based object store. The exported catalog is then imported from the external storage to the target tenant. The data of the source tenant is exported to the external storage, and, once completed, imported to the target tenant. Appropriate checks are performed to ensure that the catalog and data of the target tenant are identical to the catalog and data of the source tenant. If so, future requests to the tenant are directed to the target tenant on the target database instance.

Figure 1:
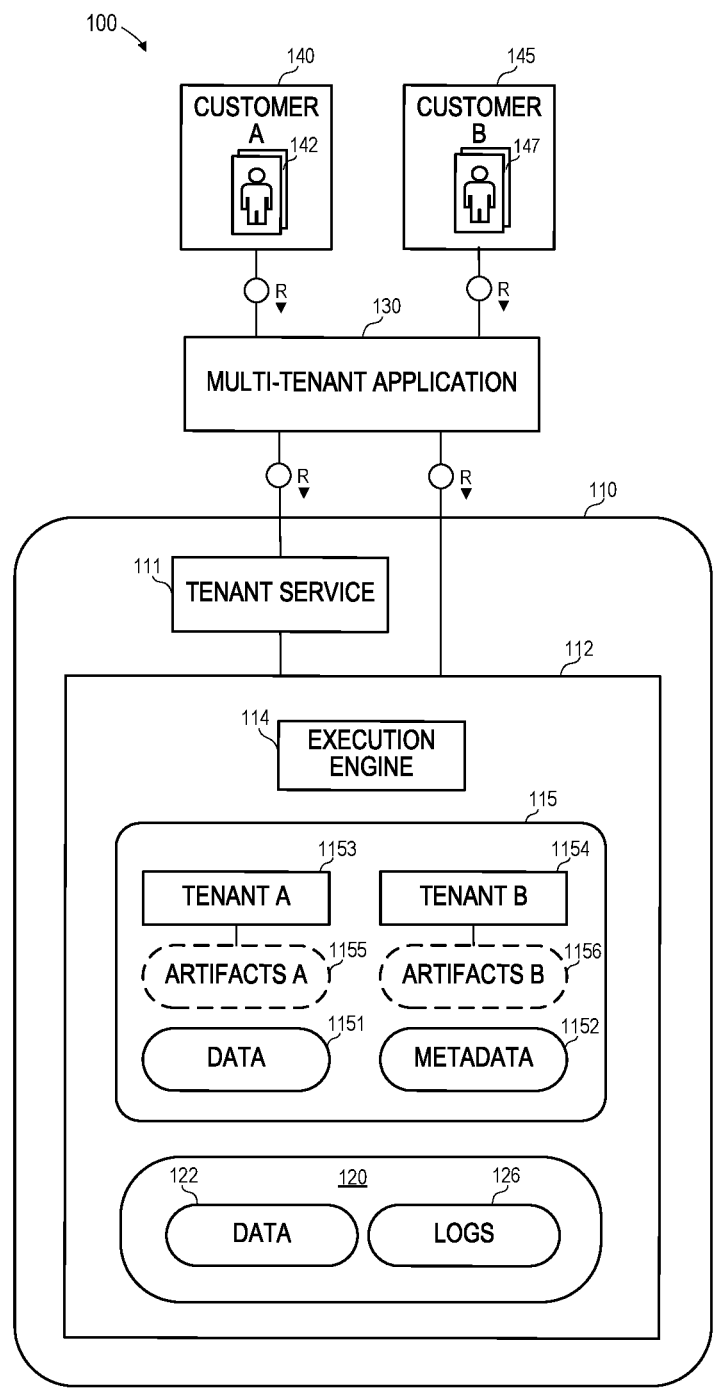
FIG. 1 is a block diagram of a database system providing native multi-tenancy and according to some embodiments.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/or any other metric.

Database platform 110 provides infrastructure for creating, managing and using native multi-tenant database instances. Database instance 112 is a database providing native multi-tenancy according to some embodiments. Database instance 112 may be provisioned on any suitable combination of hardware and software, including one or more computer servers or virtual machines of database platform 110. In some embodiments, database instance 112 comprises a containerized application executing within a software container. Such containers may be implemented by one or more nodes of a cluster (e.g., a Kubernetes cluster) as is known in the art. Accordingly, database platform 110 may be implemented by an orchestration cluster and one or more application clusters.

Database instance 112 includes execution engine 114 for responding to client queries based on data and metadata stored in volatile (e.g., Random Access) memory 115. Memory 115 includes data 1151 and metadata 1152 of all tenants created within database instance 112. Data 1151 may include row store tables, column store tables, and system tables. As is known in the art, the data of each row of a row store table is stored in contiguous memory locations of memory 115, and the data of columns of column store tables is stored in contiguous memory locations of memory 115. The system tables may store metadata defining a database catalog, users, etc. Memory 115 also stores program code and stack, and memory required for temporary computations and database management.

Multi-tenant application 130 may comprise a SaaS application but embodiments are not limited thereto. Multi-tenant application 130 may be provisioned on one or more computer servers or virtual machines and may comprise a containerized application executing within a software container. Multi-tenant application 130 issues queries (e.g., SQL, MDX) to database instance 112 based on input received from users 142 and 147 of customers 140 and 145, respectively. Such queries may pass through a service manager associated with application 130 and a service broker associated with platform 110 before receipt by database instance 112.

Database platform 110 according to some embodiments supports requests for tenant-level lifecycle operations which would otherwise need to be implemented by the application. These operations may include tenant creation, tenant drop, tenant move, tenant restore from backup, tenant clone, tenant resize and tenant resource limitation. In some embodiments, and as will be described below, shared tenant service 111 exposes APIs (e.g., via REST) which are called by multi-tenant applications (using appropriate management credentials) to request execution of these tenant-level lifecycle operations by database instance 112.

Each tenant of system 100 will be described as corresponding to a customer, where a customer may be a company, a division, a workgroup, or any other group of users. A tenant may correspond to a particular cloud resource/service subscription of a given customer. In this regard, a customer may be associated with more than one subscription and therefore more than one tenant.

Memory 115 includes multiple instances of a tenant object defined in metadata 1152. Each tenant object instance is a collection of database artifacts, where the artifacts assigned to each tenant instance are stored within data 1151. The database artifacts assigned to a tenant instance may include, for example, one or more schemas, tables, and partitions. The database artifacts also include a tenant-level catalog (i.e., tenant-level metadata) defining views on the tenant's tables, virtual tables, caches, remote sources, workload classes used to govern resource usage for the tenant's database objects, and database users.

Memory 115 includes tenant instance 1153 of tenant 'A' and tenant instance 1154 of tenant 'B'. Each tenant instance 1153 and 1154 is an instance of a tenant object defined in metadata 1152. Tenant instances 1153 and 1154 may be stored within data 1151 but are depicted separate therefrom for ease of understanding.

Each tenant instance 1153 and 1154 is a collection of database artifacts. The artifacts assigned to each tenant instance 1153 and 1154 are stored among data 1151 and metadata 1152. Accordingly, artifacts A 1155 assigned to tenant instance 1153 and artifacts B 1156 assigned to tenant instance 1154 are depicted using dashed lines to represent references to database artifacts of data 1151 and metadata 1152. The database artifacts assigned to a tenant instance may include, for example, one or more schemas, tables, and partitions. The database artifacts may also include metadata defining views on the tenant's tables, virtual tables, and remote sources.

The lifecycle of a tenant may be decoupled from the lifecycle of its assigned database artifacts. However, in some embodiments, deleting a tenant from a database instance results in deleting artifacts assigned thereto, so long as those artifacts are not assigned to another tenant of the database instance.

It will be assumed that customer A 140 corresponds to a first tenant (e.g., tenant A 1153) of database instance 112 and that customer B 145 corresponds to a second tenant (e.g., tenant B 1154) of database instance 112. Upon receipt of input from a user 142 of customer A 140, multi-tenant application 130 may transmit a query to database instance 112 which indicates an association with the first tenant. Similarly, upon receipt of input from a user 147 of customer B 145, multi-tenant application 130 may transmit a query to database instance 112 along with an indication that the query is associated with the second tenant.

Accordingly, multi-tenant application 130 is able to determine the tenant which corresponds to a user from whom input is received. For example, each user may logon to multi-tenant application 130 using a tenant-specific subscription. Multi-tenant application 130 therefore associates a user with the tenant of the subscription under which the user has logged on. In another example, communications between users and multi-tenant application 130 may include tenant-identifying tokens.

Bindings defined in the above-mentioned service broker indicate which tenants are placed on which database instances. In this regard, multi-tenant application 130 may request provisioning of database instances on platform 110 using a suitable service thereof and creation of tenants on provisioned database instances using tenant service 111. Upon receiving input from a user associated with a given tenant at multi-tenant application 130, corresponding queries may thereby be directed to an appropriate database instance which hosts the given tenant.

Upon receipt of a query from multi-tenant application 130, execution engine 114 processes the query using the artifacts (e.g., row store tables) which have been assigned to the particular tenant with which the query is associated. Each time a query received from an application consists of a transaction on data in memory 115, the transaction is logged as a log entry of a log segment stored within data 1151. The pre-transaction version of the data page is stored as an undo data page, and the data page as changed by the transaction is marked as "dirty". Periodically, and as is known in the art, a savepoint is created by writing the dirty data pages and the corresponding undo data pages of data 1151 to persistent storage 120.

Persistent storage 120 includes data volume 122 for storing the data pages of the savepoint and log volume 126 for storing the log pages of the savepoint. The pages of the savepoint represent a consistent state of data 1151 of all assigned tenants. Data volume 122 may also include "snapshots", or saved copies, of the data pages of respective savepoints.

Persistent storage 120 may be implemented using any persistent data storage system that is or becomes known, including but not limited to distributed data storage systems. Persistent storage 120 persists encrypted data of all assigned tenants.

Database instance 112 thereby provides a single data server including the data and metadata of all tenants of the database instance, engines for processing the data, and a single persistence for the data and metadata. Hosting multiple independent tenants on such a single database instance facilitates sharing of computing resources at near-zero marginal cost.

Figure 2:
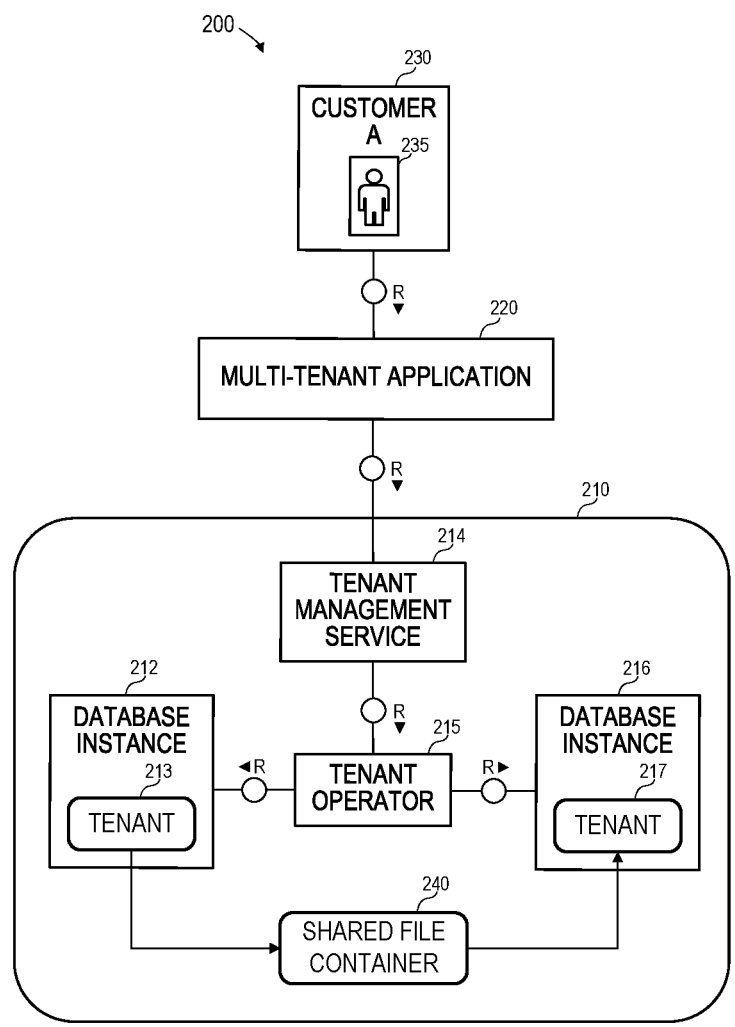
FIG. 2 illustrates an architecture implementing a tenant-level move operation according to some embodiments.

FIG. 2 is a block diagram of architecture 200 illustrating a tenant move operation according to some embodiments. Architecture 200 includes database platform 210 which may include the components described above with respect to database platform 110. For example, database instance 212 may include the components of and operate as described above with respect to database instance 112.

Database instance 212 is depicted as including tenant 213 and may include other unshown tenants. Database instance 216 has been provisioned and configured as a suitable target instance to which tenant 213 can be moved. For example, database instance 216 is configured with a memory size suitable for storing the data of tenant 213.

Multi-tenant application 220 calls tenant management service 214 to request a tenant move operation in response to corresponding requests received from user 235 of customer 230. The tenant move operation may specify a source database instance, a source tenant, a target database instance and a key management configuration. In the present example, the source database instance is instance 212, the source tenant is tenant 213, the target database instance is instance 216, and the key management configuration is the key management configuration of tenant 213 (e.g., a customer-specific encryption key management configuration or a customer-controlled encryption key management configuration).

A gateway between multi-tenant application 220 and tenant management service 214 may confirm the identity of user 235 and the authority of user 235 to initiate a tenant move operation. In some embodiments, this confirmation is performed by attempting to log on to database instance 212 using credentials provided in the call.

Tenant management service 214 forwards the request to tenant operator 215. Various mechanisms for forwarding the request from tenant management service 214 to tenant operator 215 will be described below. Tenant operator 215 may comprise a tenant move service according to some embodiments.

Prior to the movement of any metadata or data of tenant 213, checks may be performed for connectivity from operator 215 to instances 212 and 216, and/or for any objects which are referenced across tenant 213 and another tenant of database instance 212. Such objects might not be movable from database instance 212.

Shared file container 240 may already be provisioned within platform 210 prior to reception of the current tenant move request. In other embodiments, container 240 is provisioned/deprovisioned per tenant move request after the above-described checks. Next, a secure environment is provisioned in each of instances 212 and 216 to include corresponding certificates which will be used to access shared file container 240 during export and import operations as described below.

Tenant 217 is created on database instance 216. Tenant 217 is not associated with any artifacts and is associated with the same key management configuration as tenant 213.

Tenant operator 215 then issues SQL statements to database instances 212 and 216 to perform the requested tenant move operation. Database instances 212 and 216 might only execute certain operations if requested under certain internal accounts. Accordingly, tenant operator 215 may first retrieve the credentials of such an internal user account from a vault to which multi-tenant application 220 does not have access, log into database instances 212 and 216 using the credentials, and issue the SQL statements under that internal user account.

Tenant operator 215 issues an SQL statement to database instance 212 to export a tenant-level catalog (i.e., tenant-level metadata) of tenant 213 to shared file container 240, such as but not limited to a cloud-based object store. Database instance 212 uses the certificates of the secure environment to access shared file container 240 and store the exported catalog therein. Database instance 212 may use a customer-controlled encryption key associated with tenant 213 to encrypt the catalog prior to export to shared file container 240.

Tenant operator 215 then issues an SQL statement to database instance 216 to import the tenant-level catalog of tenant 213 from shared file container 240 to tenant 217. Database instance 216 uses the certificates of its secure environment to access shared file container 240 and import the encrypted catalog therefrom. Since tenant 217 shares a same key management configuration as tenant 213, database instance 216 may access a customer-controlled encryption key associated with tenant 213 to decrypt the imported catalog prior to storage in database instance 216.

Similarly, tenant operator 215 issues an SQL statement to database instance 212 to export data (e.g., all tables associated with tenant 213 which include data rows) of tenant 213 to shared file container 240, and database instance 212 encrypts the data and exports the data. Tenant operator 215 then issues an SQL statement to database instance 216 to import the data of tenant 213 from shared file container 240. Database instance 216 retrieves the data from container 240 using its certificate, decrypts the data using the encryption key of tenant 213 and associates the decrypted data with tenant 217.

Embodiments may further include export/import of table entries including metadata of database containers and models. Appropriate checks are performed to ensure that the catalog and data of the target tenant are identical to the catalog and data of the source tenant. For example, an object list associated with tenant 213 may be compared against an object list associated with tenant 217, and row counts of tables associated with tenant 213 may be compared against row counts of respective tables of tenant 217.

Tenant 213 is dropped from database instance 212 upon successful completion of the move to instance 216. Some embodiments may further include dropping the secure environments from instances 212 and 216, deleting all files from shared file container 240, and dropping the certificates used to access shared file container 240 from instances 212 and 216.

Figure 3A:
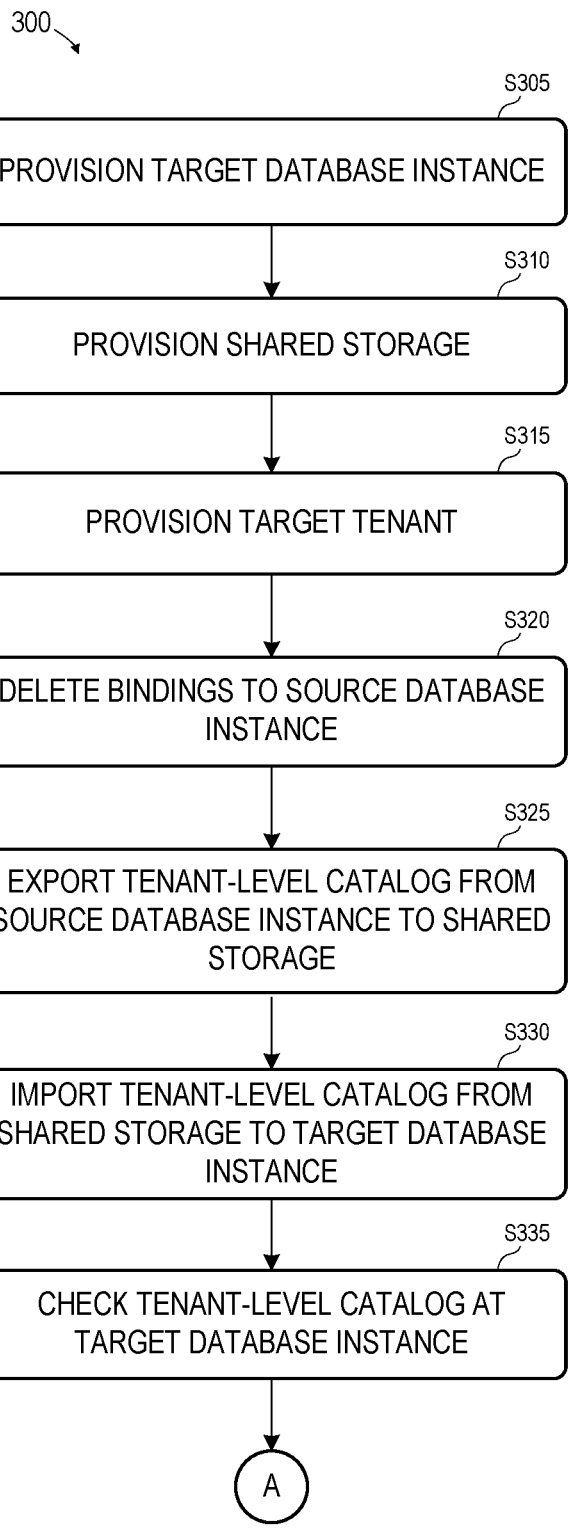
FIGS. 3A and 3B comprise a flow diagram of a tenant-level move operation according to some embodiments.
Figure 3B:
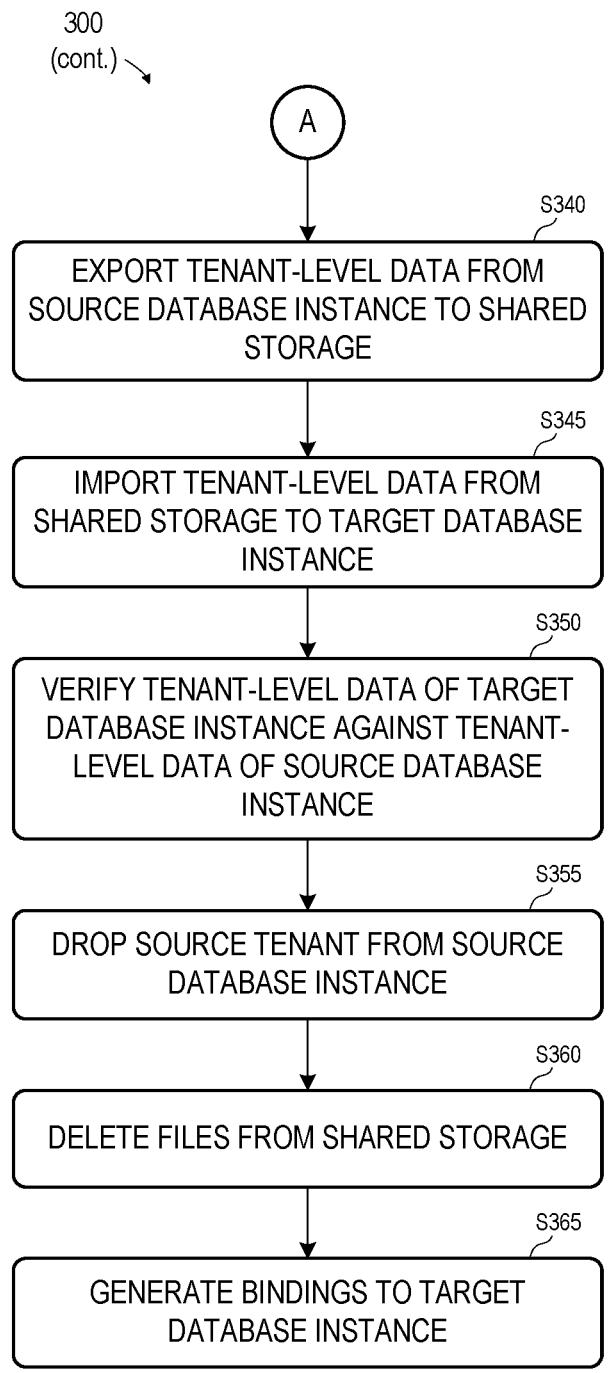

FIGS. 3A and 3B comprise a flow diagram of process 300 to provide tenant lifecycle management operations according to some embodiments. Process 300 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to execution of process 300, a database instance including at least one tenant has been provisioned. The database instance includes a tenant manager user account which is only usable by components of the database platform and which may issue SQL calls to the database instance for performing tenant lifecycle operations. Credentials (e.g., username and password) of the tenant manager user account may be stored in a storage external to the database platform (e.g., a cloud-based secure storage, Vault by HashiCorp).

Process 300 is initiated in response to a request to move a tenant from the database instance to a target database instance. The request may specify a source database instance, a source tenant, a target database instance and a key management configuration.

Assuming the request is received from a user authorized to request such a move, a target database instance is provisioned at S305. A service operator may provision a database instance with a memory size suitable for storing the data of the specified source tenant. S305 is skipped if the tenant move request specifies an existing target database instance.

A shared storage is provisioned at S310 if not already existing. The shared storage is provisioned to allow access by the source database instance and the target database instance. S310 may include provisioning a secure environment in the source and target database instances to include certificates for accessing the shared storage.

The target tenant is provisioned on the target database instance at S315. The target tenant is not associated with any artifacts and is provisioned with the same key management configuration as the source tenant 213. At S320, bindings to the source database instance are deleted. The bindings may be managed by a service broker and may be used to route requests of the source tenant to the source database instance. Accordingly, such requests are no longer routed to the source database instance after S320.

The tenant-level catalog of the source tenant is exported from the source database instance to the shared storage at S325. The export may be triggered by issuance of an SQL statement to the source database instance. The source database instance may use the certificates of its secure environment to access the storage and export the catalog thereto. Issuance of the SQL statement may include retrieval of tenant manager user credentials from a vault as described above. In some embodiments, the catalog is encrypted using a customer-controlled encryption key associated with the source tenant prior to export to the shared storage.

The tenant-level catalog of the source tenant is imported from the shared storage to the target database instance at S330. The import may be triggered by issuance of an SQL statement to the target database instance, which may use the certificates of its secure environment to access the storage and import the catalog therefrom. The target database instance may decrypt the catalog using a customer-controlled encryption key associated with the source tenant after the import. In this regard, the target tenant is provisioned with the same key management configuration as the source tenant and therefore may access the same encryption keys as the source tenant.

A check is performed at S335 to verify the import of the tenant-level catalog to the target tenant. For example, a catalog object list of the source tenant may be compared against a catalog object list associated with the target tenant. Embodiments may further include copying of table entries including metadata of database containers and models from the source database instance to the target database instance.

Next, at S340, tenant-level data associated with the source tenant is exported from the source database instance to the shared storage. S340 may include issuance of an SQL statement to the source database instance, causing the source database instance to encrypt the data and exports the data to the shared storage. At S345, the tenant-level data is imported from the shared storage to the target database instance. The target database instance may similarly receive an SQL statement to import the data and, in response, retrieve the data from the shared storage using its certificate, decrypt the data using the encryption key of the source tenant and associate the decrypted data with the target tenant.

The tenant-level data imported to the target database instance is verified against the tenant-level data of the source database instance at S350. For example, the row counts of each table associated with the source tenant may be compared against row counts of respective tables of the target tenant.

The source tenant is dropped from the source database instance at S355, assuming all verification checks are successful. Moreover, any files remaining in the shared storage are deleted at S360. At S365, bindings to the target database instance are generated. The bindings are used to direct requests which were previously directed to the source tenant of the source database instance to the target tenant of the target database instance.

Figure 4:
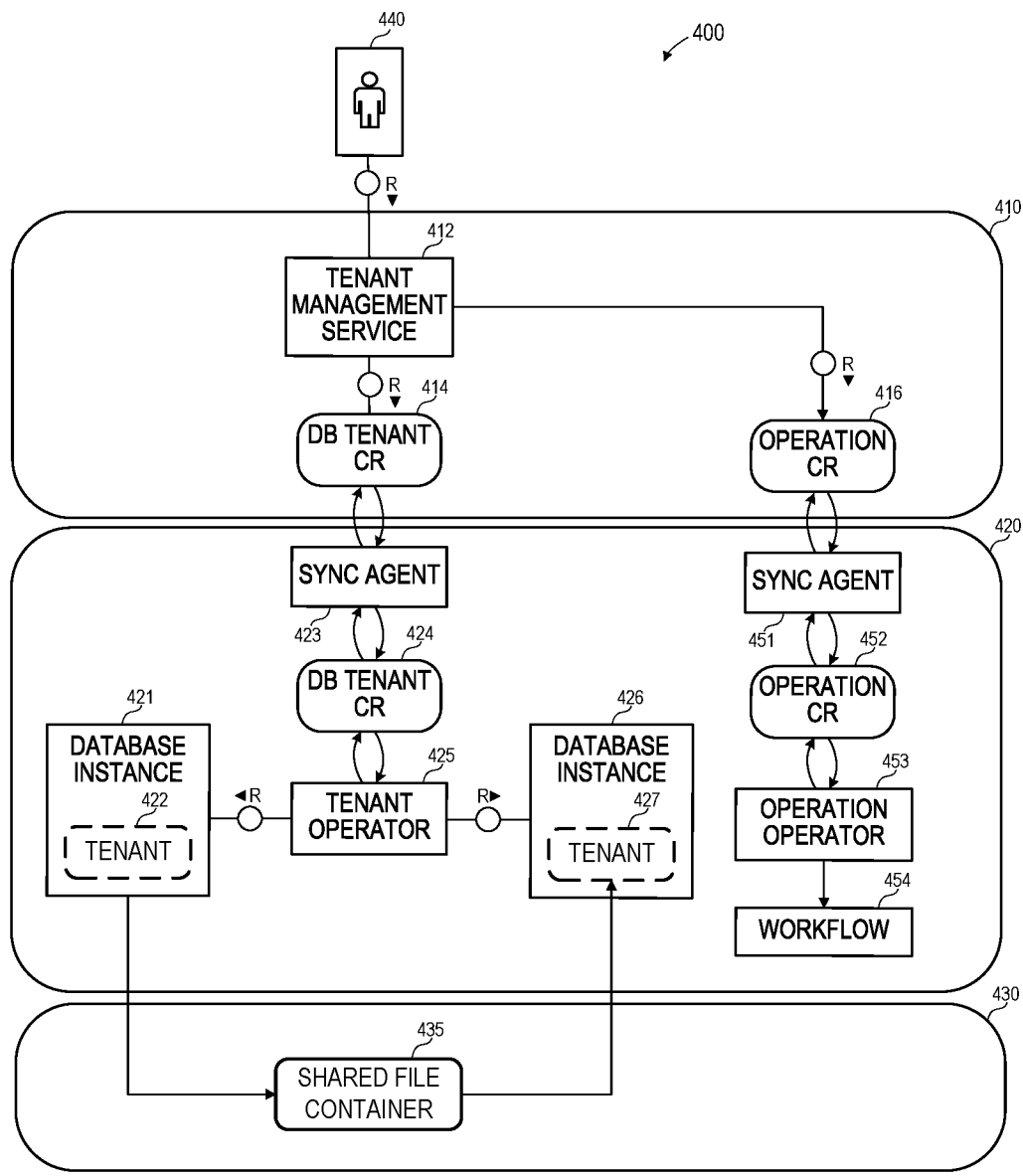
FIG. 4 illustrates a custom resource-based architecture implementing a tenant-level move operation according to some embodiments.

FIG. 4 illustrates architecture 400 according to some embodiments. Architecture 400 may comprise an implementation of architecture 100 of FIG. 1. Both of architecture 100 and architecture 400 may execute process 300 according to some embodiments.

Architecture 400 includes orchestration cluster 410, database-as-a-service cluster 420, and storage-as-a-service cluster 430. As is known in the art, each of clusters 410, 420 and 430 may include one or more nodes implementing software containers for executing containerized applications. The containers of clusters 420 and 430 may execute applications to be provided as a service to third parties while the containers of orchestration cluster 410 may execute applications for building and managing the containerized applications within clusters 420 and 430.

According to some embodiments, clusters 410, 420 and 430 conform to the Kubernetes container orchestration system. Clusters 410, 420, and 430 may execute software extensions, or operators, to manage associated applications and their components based on custom resources. In some instances, an operator watches for creation/update/deletion of custom resources and executes responsive actions using applications corresponding to the custom resources.

Database tenant custom resource 414 is deployed in cluster 410 and describes an existing tenant in a given database instance. The following is an example of a database tenant custom resource 414 according to some embodiments:

kind: DBTenant
  metadata:
    name: <tenant_instance_guid> // e.g. c247c0c3-50d3-4a47-a6c2-eba317d92238
    labels:
      globalaccount_id: ggg
      subaccount_id: zzz
      service_instance_id: yyy
    spec:
      name: xxx
      assigner: <tenant assigner>
      serviceInstanceID: yyy
  status:
    endpoints:
      sql: "xxxxxx.ondemand.sap.com:443"
    conditions:
      lastProbeTime: "1970-01-01T00:00:00Z"
        lastTransitionTime: "2021-10-08T01:33:45Z"
        reason: DBServiceNotFound|AssignerNotFound| . . .
        status: "True|False|Unknown"
        type: Ready tenant_instance_guid is a GUID that uniquely identifies a tenant across all landscapes. Its value may be generated by tenant management service 412. The specified SQL endpoint is the endpoint of the database instance in which the tenant resides. In some embodiments, the custom resources of each tenant within a same database instance specify the same SQL endpoint.

As illustrated in FIG. 4, sync agent 423 of cluster 420 monitors database tenant custom resource 414 for changes and synchronizes any such changes to database tenant custom resource 424 of database cluster 420. Conversely, sync agent 423 monitors database tenant custom resource 424 for changes and synchronizes any such changes to database tenant custom resource 414 of database cluster 410.

Tenant operator 425 reacts to changes to database tenant custom resource 424 in order to reconcile the changed database tenant custom resource 424 with the service instance specified in the custom resource. For example, if database tenant custom resource 424 describes a tenant within database instance 421 and the tenant does not in fact exist within database instance 421, operator 425 initiates the steps to create the tenant. Similarly, if a particular tenant exists within database instance 421 but the changed custom resource 424 does not associate that tenant with database instance 421, tenant operator 425 issues SQL commands to database instance 421 to delete the tenant.

Tenant management service 412 may receive a request from user 440 to move database tenant 422 from database instance 421 to database instance 426. In response, tenant management service 412 generates a corresponding operation custom resource 416 in cluster 410. Sync agent 451 syncs the operation custom resource 416 to operation custom resource 452 of cluster 420. Operation operator 453 reacts to changes to operation custom resource 452 to reconcile the state of cluster 420 with the changed operation custom resource 452. For example, operator 453 may execute the steps of process 300 to move tenant 422 to database instance 426. According to some implementations, operator 453 creates workflow 454 (e.g., an Argo Workflow) to perform the move operation, initiates execution of the workflow, monitors the status of the workflow execution and updates operation custom resource 452 to reflect the status.

After completion of the tenant move, tenant operator 425 may update database tenant custom resource 424 to reflect movement of tenant 422 from database instance 421 to database instance 426. Sync agent 423 synchronizes the update to database tenant custom resource 414 as described above.

Figure 5:
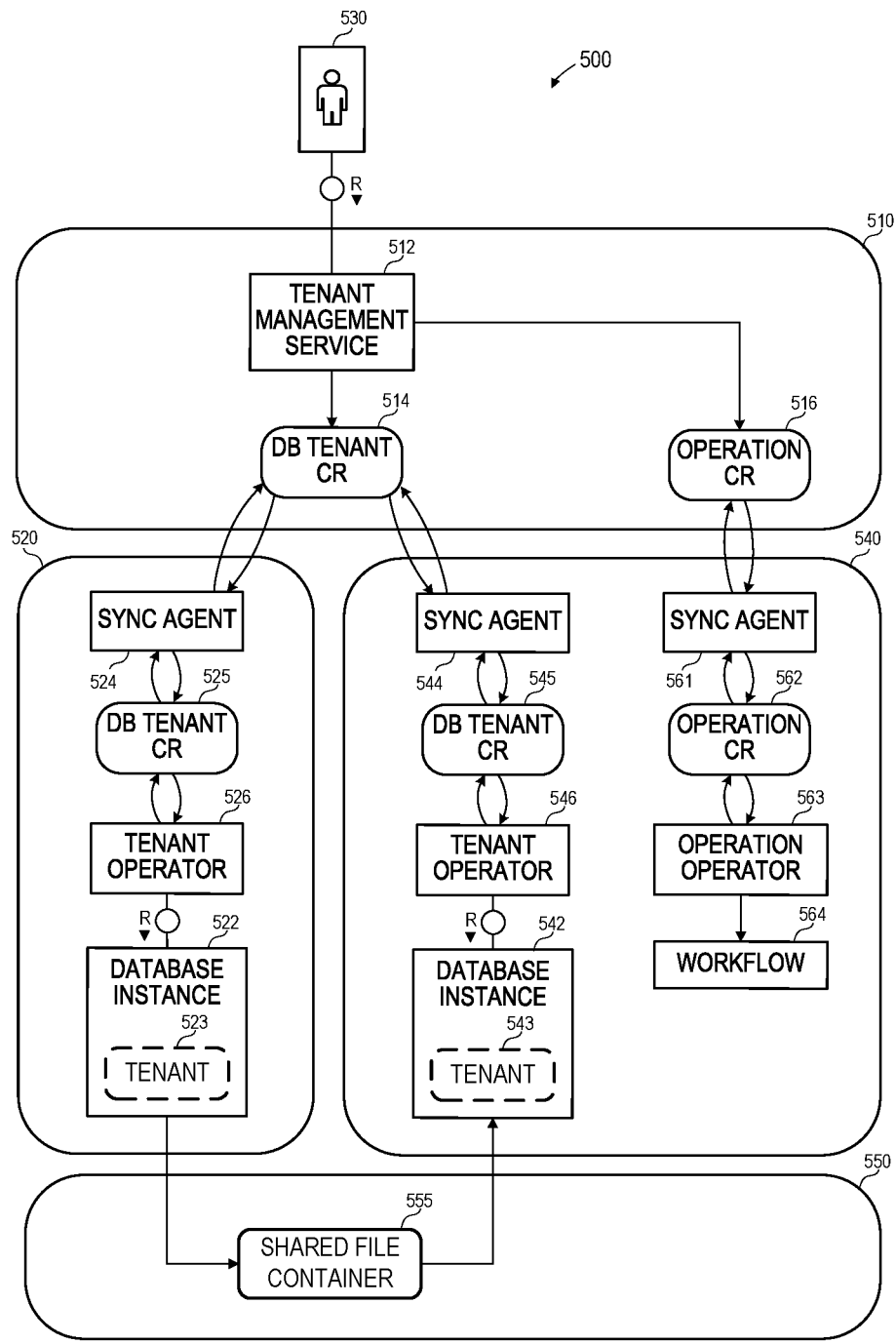
FIG. 5 illustrates a custom resource-based architecture implementing a tenant-level move operation from a database instance in a first cluster to a database instance in a second cluster according to some embodiments.

Architecture 500 of FIG. 5 is similar to architecture 400 of FIG. 4. However, source database instance 522 executes within cluster 520 while target database instance 542 executes within cluster 540. Operation operator 563 may operate as described above to move tenant 523 to database instance 542 in response to a change to operation custom resource 562 caused by a received tenant move command. After such a move, tenant operator 526 acts to delete database tenant custom resource 525 associated with tenant 523, while tenant operator 546 creates a database tenant custom resource 545 corresponding to tenant 543. Each of these changes is synchronized to database tenant custom resource 514 by sync agent 524 and sync agent 544, respectively.

Figure 6:
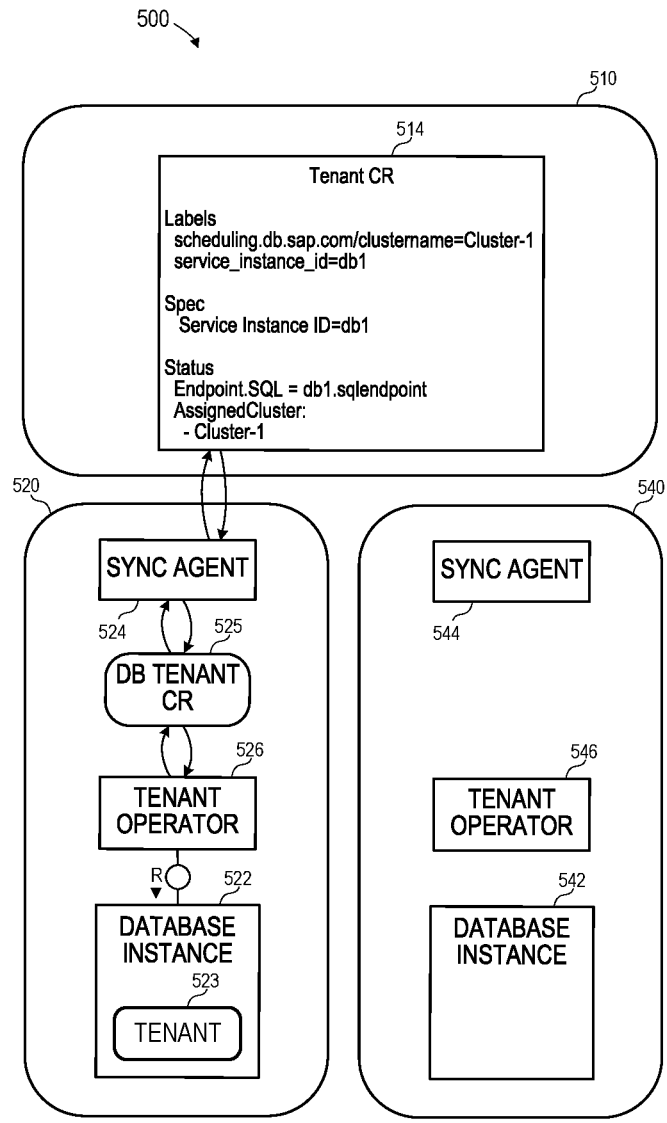
FIG. 6 illustrates a custom resource-based architecture prior to a tenant-level move operation from a database instance in a first cluster to a database instance in a second cluster according to some embodiments.

FIGS. 6-9 illustrate changes to a database tenant custom resource of an orchestration cluster during a tenant move operation according to some embodiments. In particular, FIG. 6 illustrates components of above-described architecture prior to a tenant-level move from database instance 522 of cluster 520 to database instance 542 of cluster 540 according to some embodiments. The tenant represented by tenant custom resource 514 (i.e., tenant 523) resides in database instance db1 (i.e., database instance 522) which itself resides in Cluster-1 (i.e., cluster 520).

Figure 7:
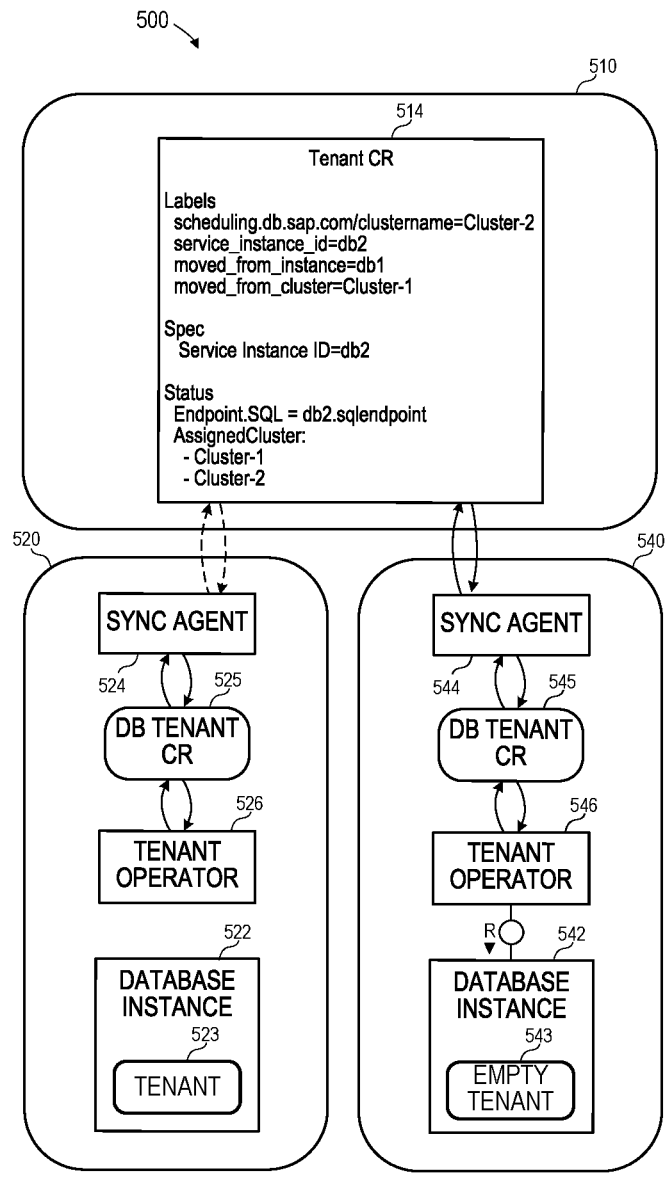
FIG. 7 illustrates a custom resource-based architecture during a tenant-level move operation from a database instance in a first cluster to a database instance in a second cluster according to some embodiments.

It is assumed that a request is received to move tenant 523 from database instance 522 of cluster 520 to database instance 542 of cluster 540. FIG. 7 illustrates changes made to database tenant custom resource 514 in response to such a request according to some embodiments. For example, the label scheduling.hc.sap.com/clustername is changed to identify cluster 540 (i.e., Cluster-2), and the label service_instance_id is changed to identify database instance 542 (i.e., db2). Additional information specifies that the associated tenant has been moved_from_cluster Cluster-1 and moved_from_instance db1.

Similarly, the Service Instance ID is changed to db2 (i.e., database instance 542) and the SQL endpoint is the endpoint of database instance 542 (i.e., db2.sqlendpoint). The dashed lines between sync agent 522 and database tenant custom resource 514 are intended to indicate that sync requests are ignored and the changes to database tenant custom resource 514 are not synchronized to database tenant custom resource 525 at this point of the tenant move operation. In contrast, sync agent 544 of cluster 540 updates database tenant custom resource 545 to indicate the tenant is assigned to both Cluster-1 and Cluster-2.

Figure 8:
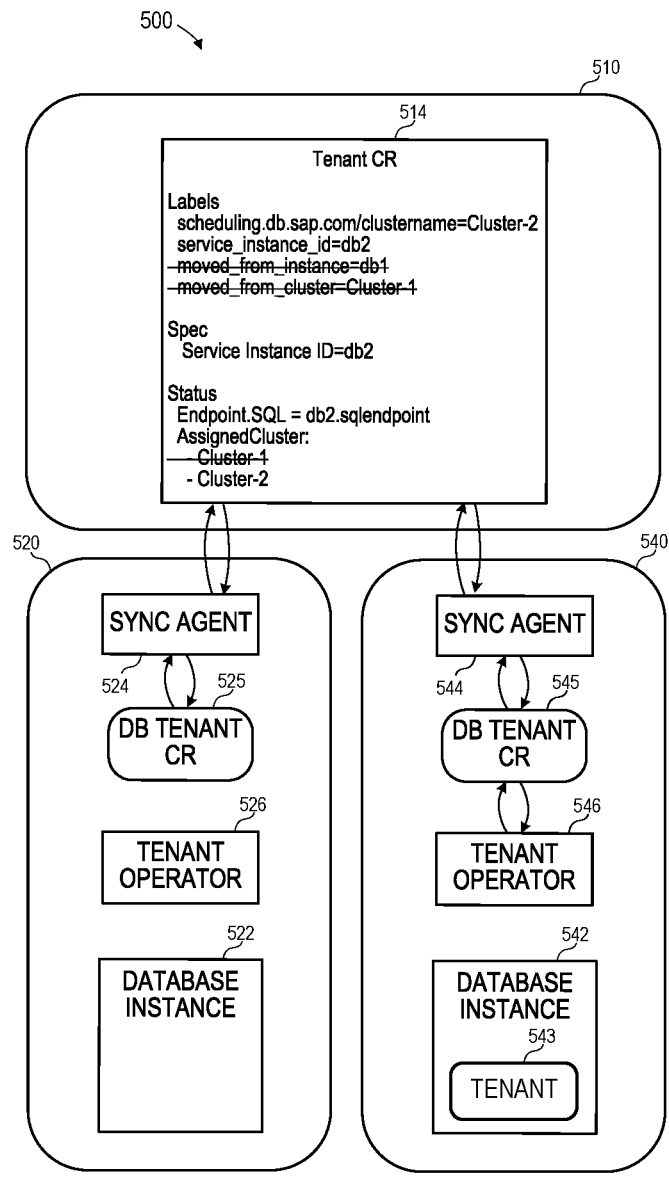
FIG. 8 illustrates a custom resource-based architecture after a tenant-level move operation from a database instance in a first cluster to a database instance in a second cluster according to some embodiments.

FIG. 8 illustrates architecture 500 after successfully moving the tenant to the target database instance. References to db1 and Cluster-1 are removed from database tenant custom resource 514. Sync agent 524 synchronizes these changes to database tenant custom resource 525. Tenant operator 526 reconciles these changes by dropping tenant 523 from database instance 522.

Figure 9:
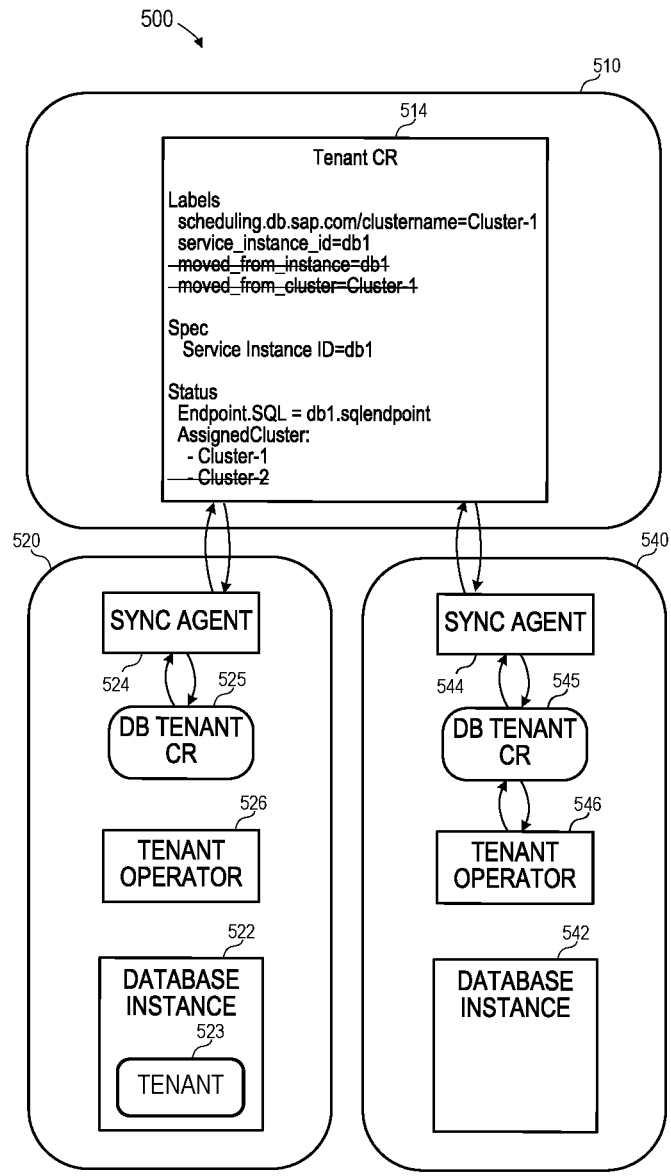
FIG. 9 illustrates a custom resource-based architecture after rollback of a tenant-level move operation from a database instance in a first cluster to a database instance in a second cluster according to some embodiments.

FIG. 9 illustrates architecture 500 if it is determined that the tenant move operation was unsuccessful. To rollback the operation, database tenant custom resource 514 is modified to the state shown in FIG. 6. Sync agent 524 then resumes synchronization with database tenant custom resource 525. At cluster 540, database tenant custom resource 545 is also synchronized with database tenant custom resource 514. Tenant operator 526 reconciles the resulting changes to database tenant custom resource 545 by dropping tenant 543 from database instance 542.

Figure 10:
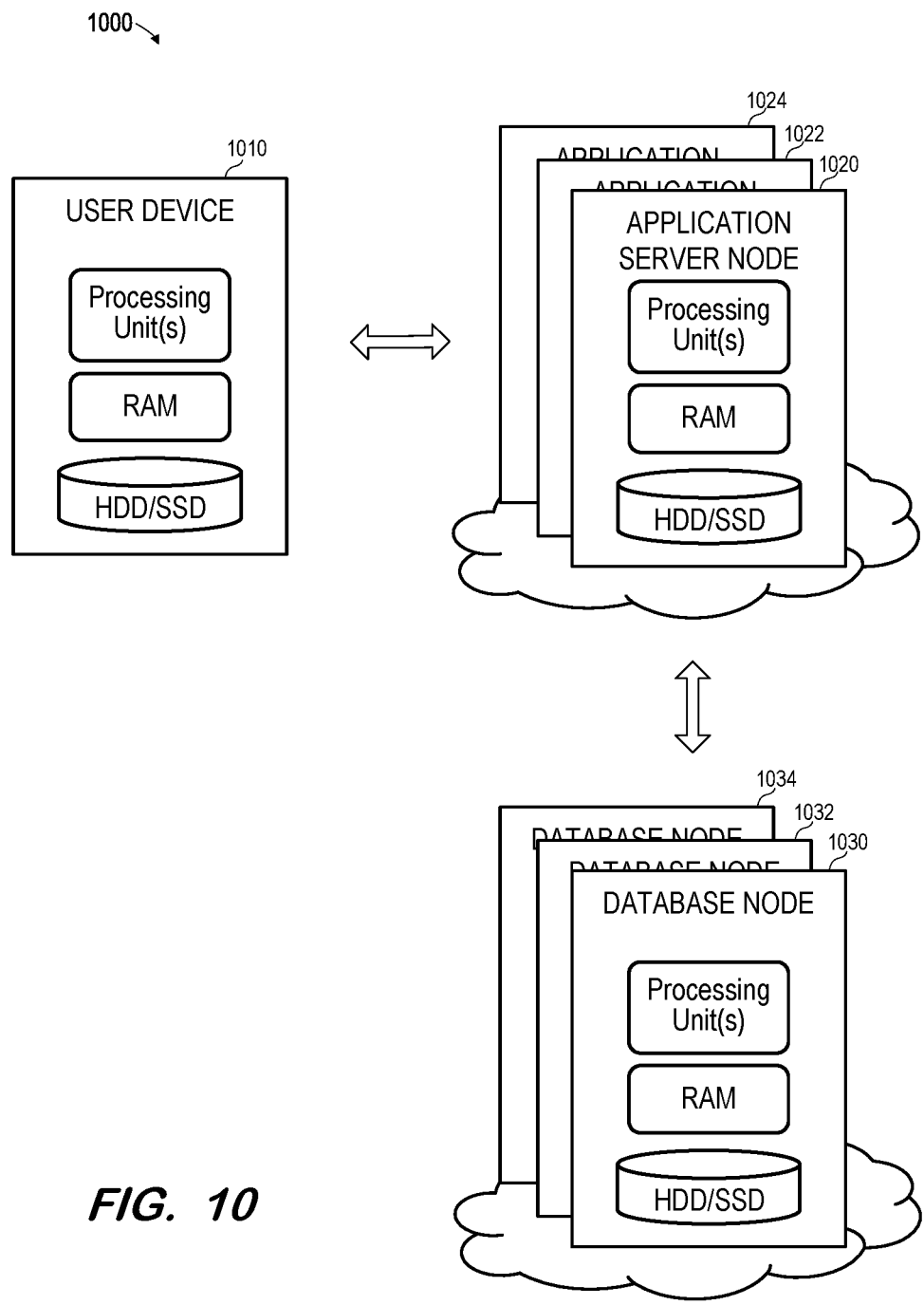
FIG. 10 is a block diagram of a cloud-based cluster architecture according to some embodiments.

FIG. 10 illustrates cloud-based database deployment 1000 according to some embodiments. User device 1010 may comprise any suitable computing system operable by a user to access a cloud-based application. User device 1010 may store and execute program code of a Web browser to access a Uniform Resource Locator (URL) associated with a login page of such an application. The Web browser may download and execute program code of a client-side component of an application as is known in the art.

Application server nodes 1020, 1022 and 1024 may host an application according to some embodiments. The application may comprise a multi-tenant application and server nodes 1020, 1022 and 1024 may be geographically distributed. Server nodes 1020, 1022 and 1024 may comprise nodes of one or more Kubernetes clusters.

Database nodes 1030, 1032 and 1034 may host one or more database instances accessible to the multi-tenant application and providing native multi-tenancy as described herein. Database nodes 1030, 1032 and 1034 may comprise nodes of an orchestration cluster, a database cluster and/or a storage cluster as is known in the art. Each node of deployment 1000 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A computer-implemented method comprising:
  receiving a request to move a first database tenant from a first database instance to a second database instance, the first database tenant comprising a first tenant object instance associated with a plurality of artifacts of the first database instance, the plurality of artifacts including metadata and data; and
  in response to the request:
  exporting the metadata associated with the first database tenant from the first database instance to a shared storage system, the metadata including a customer-controlled key management configuration;
  importing the metadata to a second database tenant of the second database instance from the shared storage system;
  acquiring, by the first database instance and based on the customer-controlled key management configuration, a customer-controlled encryption key associated with the first database tenant;
  encrypting the data at the first database instance using the customer-controlled encryption key;
  exporting the encrypted data associated with the first database tenant from the first database instance to the shared storage system;
  importing the encrypted data to the second database tenant of the second database instance from the shared storage system;
  acquiring, by the second database instance and based on the customer-controlled key management configuration, the customer-controlled encryption key associated with the first database tenant;
  decrypting the data at the second database instance using the customer-controlled encryption key; and
  dropping the first database tenant from the first database instance.

2. A method according to claim 1, further comprising:
  provisioning the shared storage system;
  provisioning the first database instance with a first certificate to access the shared storage system; and
  provisioning the second database instance with a second certificate to access the shared storage system,
  wherein the first database instance uses the first certificate to export metadata to the shared storage system and to export data to the shared storage system, and
  wherein the second database instance uses the second certificate to import metadata from the shared storage system and to import data from the shared storage system.

3. A method according to claim 1, further comprising:
   detecting the request with a Kubernetes operator,
   wherein the Kubernetes operator triggers an Argo Workflow to respond to the request.

4. A method according to claim 1, wherein the first database instance executes in a first application cluster, the second database instance executes in a second application cluster, and the shared storage system executes in a third application cluster.

5. A method according to claim 1, wherein the first database instance and the second database instance execute in a first application cluster and the shared storage system executes in a second application cluster.

6. A system comprising:
   a storage system; and
   a database platform in communication with the storage system and comprising:
   a memory storing executable program code; and
   at least one processing unit to execute the program code to cause the database platform to:
   detect a request to move a first database tenant from a first database instance to a second database instance, the first database tenant comprising a first tenant object instance associated with a plurality of artifacts of the first database instance, the plurality of artifacts including metadata and data; and
   in response to the request:
   instruct the first database instance to export the metadata associated with the first database tenant to the storage system, the metadata including a customer-controlled key management configuration;
   instruct the second database instance to import the metadata from the storage system to a second database tenant of the second database instance;
   instruct the first database instance to acquire a customer-controlled encryption key associated with the first database tenant based on the customer-controlled key management configuration, encrypt the data associated with the first database tenant using the customer-controlled encryption key, and export the encrypted data to the storage system;
   instruct the second database instance to import the encrypted data from the storage system, acquire the customer-controlled encryption key associated with the first database tenant based on the customer-controlled key management configuration, and decrypt the data using the customer-controlled encryption key; and
   drop the first database tenant from the first database instance.

7. A system according to claim 6, at least one processing unit to execute the program code to cause the database platform to: provision the first database instance with a first certificate to access the storage system; and provision the second database instance with a second certificate to access the storage system, wherein the first database instance uses the first certificate to export metadata to the storage system and to export data to the storage system, and wherein the second database instance uses the second certificate to import metadata from the storage system and to import data from the storage system.

8. A system according to claim 6, wherein the database platform comprises a first application cluster, and wherein the first database instance executes in a second application cluster, the second database instance executes in the first application cluster, and the shared storage system executes in a third application cluster.

9. A system according to claim 6, wherein the database platform comprises a first application cluster, and wherein the first database instance and the second database instance execute in the first application cluster and the shared storage system executes in a second application cluster.

10. A non-transitory computer-readable medium storing executable program code, the program code executable to cause a system to:
    receive a request to move a first database tenant from a first database instance to a second database instance, the first database tenant comprising a first tenant object instance associated with a plurality of artifacts of the first database instance, the plurality of artifacts including a tenant-level catalog, a customer-controlled key management configuration and data; and
    in response to the request:
    export the tenant-level catalog and the customer-controlled key management configuration associated with the first database tenant from the first database instance to a shared storage system;
    import the tenant-level catalog and the customer-controlled key management configuration to a second database tenant of the second database instance from the shared storage system;
    acquire, by the first database instance and based on the customer-controlled key management configuration, a customer-controlled encryption key associated with the first database tenant;
    encrypt the data at the first database instance using the customer-controlled encryption key;
    export the encrypted data associated with the first database tenant from the first database instance to the shared storage system;
    import the encrypted data to the second tenant of the second database instance from the shared storage system;
    acquire, by the second database instance and based on the customer-controlled key management configuration, the customer-controlled encryption key associated with the first database tenant;
    decrypt the data at the second database instance using the customer-controlled encryption key; and
    drop the first database tenant from the first database instance.

11. A medium according to claim 10, the program code executable to cause a system to:
    provision the shared storage system;
    provision the first database instance with a first certificate to access the shared storage system; and
    provision the second database instance with a second certificate to access the shared storage system,
    wherein the first database instance uses the first certificate to export the tenant-level catalog to the shared storage system and to export the data to the shared storage system, and
    wherein the second database instance uses the second certificate to import the tenant-level catalog from the shared storage system and to import data from the shared storage system.

12. A medium according to claim 10, the program code executable to cause a system to:
    detect the request with a Kubernetes operator,
    wherein the Kubernetes operator triggers an Argo Workflow to respond to the request.

13. A medium according to claim 10, wherein the first database instance executes in a first application cluster, the second database instance executes in a second application cluster, and the shared storage system executes in a third application cluster.

14. A medium according to claim 10, wherein the first database instance and the second database instance execute in a first application cluster and the shared storage system executes in a second application cluster.

* * * * *